UNITED STATES PATENT OFFICE.

EDWARD ORANGE WILDMAN WHITEHOUSE, OF STOKE NEWINGTON, ENGLAND.

IMPROVED MODE OF PROTECTING INSULATED TELEGRAPH-WIRES.

Specification forming part of Letters Patent No. 91,393, dated June 15, 1869.

*To all whom it may concern:*

Be it known that I, EDWARD ORANGE WILDMAN WHITEHOUSE, of Stoke Newington, in the county of Middlesex, England, have invented certain new and useful Modes of Protecting Insulated Telegraph - Wires; and I hereby declare the following to be a full, clear, and exact description of the same.

Hitherto, when telegraphic wires have been covered or coated with gutta-percha, india-rubber, or other similar insulating materials, great injury has accrued to them, either from exposure to heat, or from attrition, or from decomposition, when buried in the earth, or from other circumstances.

Now, my invention consists in the application of an external coating for the protection of telegraphic wires which have been previously insulated or coated, either by means of gutta-percha or otherwise, such protecting coating or covering being composed, either entirely or in part, of compounds or combinations consisting, essentially, of xyloidine, in conjunction with volatile solvents, oils, resins, tar, asphalt, pigments, or other similar bodies.

As examples of the combinations or compounds which I employ, I will give the preparation of a combination of xyloidine with oils, paraffine, pigments, &c., with the employment of a volatile solvent. The gun-cotton or xyloidine is, by preference, used in a dry state, but humid gun-cotton may be employed.

The gun-cotton having been mixed with the volatile solvent, (such, for example, as a mixture of alcohol and ether, or of alcohol and wood-spirit, or mineral naphtha, or mixtures of the same, or wood-spirit alone may be employed,) it is then thoroughly incorporated or masticated, by the employment of rolls or masticators, during such process of mastication, the other ingredient or ingredients being added; or the oils and other ingredients may be mixed with the volatile solvent before the addition of the gun-cotton.

When the resulting compound has assumed a homogeneous plastic condition, it is suitable for being employed for the coating and protecting of telegraphic wires which have been previously coated or covered with gutta-percha or other insulating material.

The plastic material before referred to may be applied to or on the wire, by the use of any wire-coating apparatus similar to those now employed in the covering of wires with gutta-percha, or otherwise.

I am aware that it has been proposed to employ a solution of gun-cotton in a volatile solvent for the varnishing of telegraphic wires which have been previously coated with an insulating material; but my invention differs therefrom, in that I employ a plastic mass, composed of the ingredients such as are hereinbefore mentioned, and in a manner similar to that now adopted for the coating or covering of telegraphic wires by means of gutta-percha.

What I wish to secure as my invention is—

The coating and protecting of telegraphic wires, which have been previously coated or covered with an insulating material, with any of the compounds or combinations hereinbefore referred to, or with other similar compounds, they having, as part of their constituents, xyloidine or gun-cotton, in conjunction with a volatile solvent, and they being applied in a manner as hereinbefore described.

In testimony whereof I have signed my name to this specification in the presence of two subscribing witnesses.

E. O. WILDMAN WHITEHOUSE.

Witnesses:
    THOMAS I. BRUCE,
        47 *Lincoln's Inn Fields.*
    RUDOLPH CHAS. NICKOL,
        10 *Birchin Lane, London.*